United States Patent
Ito

(10) Patent No.: US 7,715,889 B2
(45) Date of Patent: May 11, 2010

(54) PORTABLE ELECTRONIC DEVICE

(75) Inventor: Goro Ito, Yokohama (JP)

(73) Assignee: Kyocera Corporation, Kyoto (JP)

( * ) Notice: Subject to any disclaimer, the term of this patent is extended or adjusted under 35 U.S.C. 154(b) by 1302 days.

(21) Appl. No.: 11/186,177

(22) Filed: Jul. 21, 2005

(65) Prior Publication Data

US 2006/0022057 A1    Feb. 2, 2006

(30) Foreign Application Priority Data

Jul. 29, 2004 (JP) ............................. 2004-221717
Jul. 29, 2004 (JP) ............................. 2004-222607

(51) Int. Cl.
*H04M 1/00* (2006.01)
(52) U.S. Cl. ............................. 455/575.3; 235/462.45; 705/40
(58) Field of Classification Search ............. 455/575.3, 455/558, 550.1; 705/39, 40; 235/462.45, 235/262.46; 200/512; 361/680

See application file for complete search history.

(56) References Cited

U.S. PATENT DOCUMENTS

| | | | |
|---|---|---|---|
| 5,943,624 A * | 8/1999 | Fox et al. .................. | 455/556.1 |
| 6,567,672 B1 * | 5/2003 | Park et al. ................. | 455/550.1 |
| 6,934,664 B1 * | 8/2005 | Webb et al. ................. | 702/188 |
| 7,181,179 B2 * | 2/2007 | Fujisawa et al. ............ | 455/129 |
| 7,181,253 B2 * | 2/2007 | Kim ......................... | 455/575.1 |
| 7,277,274 B2 * | 10/2007 | Park ....................... | 361/679.09 |
| 7,505,799 B2 * | 3/2009 | Suzuki et al. ............. | 455/575.3 |
| 2002/0119802 A1 * | 8/2002 | Hijii ........................... | 455/550 |
| 2002/0177407 A1 * | 11/2002 | Mitsumoto .................... | 455/41 |
| 2003/0228883 A1 * | 12/2003 | Kusakari et al. .......... | 455/550.1 |
| 2004/0058705 A1 * | 3/2004 | Morgan et al. ............ | 455/556.1 |
| 2004/0077372 A1 * | 4/2004 | Halpern ..................... | 455/550.1 |
| 2004/0121739 A1 * | 6/2004 | Suzuki et al. ................. | 455/84 |
| 2005/0000788 A1 * | 1/2005 | Nishimura ................... | 200/512 |
| 2005/0097038 A1 * | 5/2005 | Yu et al. ........................ | 705/40 |
| 2005/0143051 A1 * | 6/2005 | Park ............................ | 455/406 |
| 2005/0197169 A1 * | 9/2005 | Son ............................ | 455/572 |
| 2006/0063562 A1 * | 3/2006 | Hirai ........................ | 455/556.1 |
| 2007/0135164 A1 * | 6/2007 | Lee ............................ | 455/558 |

FOREIGN PATENT DOCUMENTS

JP              09-065268           3/1997

* cited by examiner

*Primary Examiner*—Olisa Anwah
(74) *Attorney, Agent, or Firm*—Hogan & Hartson LLP

(57) ABSTRACT

A portable electronic device includes a first chassis and a second chassis movably connected to one another, which can be opened away from one another and closed against one another, a magnetic recording device (a hard disk device) provided within the first chassis, and a wireless communication module (a non contact type IC module) provided within the second chassis. The portable electronic device can be operated in a mode #1 in which the operation of the non contact type IC module is permitted while the operation of the HDD section is prohibited, or in a mode #2 in which the operation of the non contact type IC module is prohibited while the operation of the HDD section is permitted. Since operation of the non contact type IC module is prohibited when the system is changed over from the mode #1 to the mode #2, accordingly the HDD section can perform reading or writing without experiencing any influence due to shock, magnetism, or electromagnetic waves.

7 Claims, 7 Drawing Sheets

AUTOMATIC TICKET EXAMINATION MACHINE

MODE #1 → MODE #2

PORTABLE ELECTRONIC DEVICE

BACKGROUND OF THE INVENTION

1. Field of the Invention

The present invention relates to a portable electronic device such as a portable telephone unit (cellular phone), a PDA, a music replay device or the like, which is equipped with a magnetic recording device such as a HDD (hard disk drive) or the like and with a wireless communication module such as a non contact type IC module or the like.

Priority is claimed on Japanese Patent Applications Nos. 2004-221717 and 2004-222607, both filed Jul. 29, 2004, the contents of which are incorporated herein by reference.

2. Description of Related Art

Recently, there has been proposed a portable telephone unit which is equipped with a non contact type IC module having a wireless communication function, or a portable telephone unit to which is detachably mounted an IC card equipped with such a non contact type IC module, and such devices have been partially implemented. Such a non contact type IC module may have, for example, a function of acting as a train ticket or season ticket, an electronic money function, a prepaid function, a personal identification function, or the like.

It is possible to perform, for example, ticket examination automatically by using the portable telephone unit which includes such a non contact type IC module. This is accomplished by data transmission and reception performed via wireless communication by the user presenting his portable telephone unit to a read-write section, which performs reading and writing of data, of a data transmitting and receiving device of an automatic ticket examination machine in a train station. It is also possible for the user, when purchasing goods, to pay the price of the goods by performing wireless communication by using his portable telephone unit which includes such a non contact type IC module. In this case, the portable telephone unit communicates with a data transmitting and receiving device which is provided in a shop.

Such a non contact type IC module typically comprises an IC chip (a semiconductor integrated circuit) and an antenna coil. The IC module performs wireless communication with an external data transmitting and receiving device via the antenna coil. The non contact type IC module may be classified into so called passive and active types. In the passive type IC module, magnetism is received from the data transmitting and receiving device, so that electrical power which is generated by electromagnetic induction is supplied to the IC chip as a power source. In the active type IC module, a power source is provided for driving the IC chip.

In recent years, portable telephones have come to require greater and greater memory capacity since a modern portable telephone unit is required to handle voice data, image data, character data and so on in order to respond to demands for high sound quality and high voice quality. However, the type of semiconductor memory which has been conventionally used is high in price, and its capacity is not so very great. Thus, it has been considered to use a HDD (Hard Disk Device) as a storage device because it can perform magnetically reading and writing a very large amount of data at a comparatively cheap price. Recently small sized HDDs have become available, and it has also become possible to incorporate them into portable telephone units (for example, refer to Japanese Unexamined Patent Application, First Publication, No. H09-65268). Accordingly, in the near future, the probability is high that it will be possible to implement a portable telephone unit which incorporates both a non contact type IC module and an HDD.

The case will now be considered in which a user passes, for example, an automatic ticket examination machine with bearing his portable telephone unit which incorporates both the non contact type IC module and the HDD.

A certain amount of magnetism (magnetic force) for generating electrical power by induction is emitted from the read-write section of such an automatic ticket examination machine towards the non contact type IC module. Moreover, the IC module performs wireless communication with the reader-writer via electromagnetic waves. Due to this, there is a possibility that the above described magnetism and electromagnetic waves may exert an influence upon the HDD so that data stored in the HDD may be destroyed, or that erroneous operation of the HDD may occur. This type of possibility is not limited to the case of a portable telephone unit; it may also occur with a different type of portable electronic device, such as a PDA or a music replay device or the like.

Furthermore, the portable telephone unit performs transmission and reception of data in a non contact manner in which its one side where the non contact type IC module is provided is approached near to a data transmitting and receiving device of the automatic ticket examination machine. However, in practice, it often happens that a user may strike the portable telephone unit against the read-write section of the data transmitting and receiving device almost to the extent of colliding it thereagainst while he passes the automatic ticket examination machine. As well known, the HDD performs writing and reading information using a magnetic head which flies with a minute distance above a magnetic disk surface which is rotating at high speed. Accordingly, an extremely accurate mechanism is used in the head mechanism etc. which reads and writes the data. Thus there are the problems that, when the portable telephone unit is struck strongly against the read-write section while the HDD performs reading or writing information, head crashing or the like, or read or write errors may occur in the HDD, so that the destruction of data may take place due to the shock caused thereby. Furthermore, there is also a possibility that the read or write operation of the HDD may be influenced by the above-mentioned magnetism for generation of electrical power via the antenna coil by electromagnetic induction.

SUMMARY OF THE INVENTION

Accordingly, an objective of the present invention is to solve the above described problems, and to protect a HDD which is incorporated in a portable electronic device when the portable electronic device is performing transmission and reception of data with a reader-writer device.

Another objective of the present invention is to reduce the influence which is exerted upon a HDD from a reader-writer device by magnetism or electromagnetic waves.

Yet another objective of the present invention is to protect a HDD which is incorporated in a portable electronic device from the shock applied to the portable electronic device.

According to the present invention, a portable electronic device includes a first chassis and a second chassis movably connected to one another to take one of an open state and a closed state, a magnetic recording device provided within the first chassis, and a wireless communication module provided within the second chassis.

Furthermore, in the portable electronic device according to the present invention, an electromagnetic wave shield member may be provided so as to be interposed between the magnetic recording device and the wireless communication module which are mutually confronting one another when the first chassis and the second chassis take the closed state in which the first and second chassis are folded to each other.

Yet further, in the portable electronic device according to the present invention, the first chassis may include, at least, a display section, and the second chassis may include, at least, a key actuation section.

Still further, in the portable electronic device according to the present invention, the key actuation section may include a key sheet which includes an electromagnetic wave shielding material in a rubber sheet upon which a plurality of actuation keys are disposed, and the key sheet may function as an electromagnetic wave shield member.

Even further, in the portable electronic device according to the present invention, the wireless communication module may be a non contact type IC module which includes an IC chip and an antenna coil.

Moreover, in the portable electronic device according to the present invention, the magnetic recording device may be a hard disk drive.

According to an another aspect of the present invention, the portable electronic device includes: a non contact type IC module; a magnetic recording device which performs read or write operation while positioning a magnetic head over a magnetic recording medium from a predetermined retraction position; and a control section which selectively sets the portable electronic device to a first mode and a second mode, in which the wireless communication operation by the non contact type IC module is permitted but the read or write operation by the magnetic recording device is prohibited in the first mode, and in which the read or write operation by the magnetic recording device is permitted but the wireless communication operation by the non contact type IC module is prohibited in the second mode.

Furthermore, in the portable electronic device according to the present invention, the control section may prohibit shifting from the second mode to the first mode even if an operation for shifting from the second mode to the first mode is made while the magnetic recording device performs the read or write operation in the second mode.

Yet further, the portable electronic device according to the present invention may further include a notification section wherein the control section may control the notification section so as to output a notification that shifting to the first mode has been prohibited when the operation for shifting to the first mode has been prohibited.

Still further, in the portable electronic device according to the present invention, the control section may prohibit shifting from the second mode to the first mode even if an operation for shifting from the second mode to the first mode is made while the magnetic recording device performs the read or write operation in the second mode, and the control section may permit shifting from the second mode to the first mode when an operation for shifting from the second mode to the first mode is made while the magnetic recording device does not perform the read or write operation in the second mode.

Even further, the portable electronic device according to the present invention may further include a notification section wherein the control section may control the notification section so as to output a notification that shifting to the first mode has been prohibited when the operation for shifting to the first mode has been prohibited, and wherein the control section may control the notification section so as to output a notification that shifting to the first mode has been completed when the operation for shifting to the first mode has been permitted.

Moreover, the portable electronic device according to the present invention may further include a notification section wherein the control section may control: the notification section so as to output a notification that the magnetic recording device performs the read or write operation when an operation for shifting from the second mode to the first mode is made while the magnetic recording device performs the read or write operation in the second mode; the magnetic recording device to move the magnetic head to the retraction position; the portable electronic device to be the first mode after the magnetic head is retracted to the retraction position; and the notification section so as to output a notification that shifting to the first mode has been completed.

Still yet further, in the portable electronic device according to the present invention, the control section may control the notification section so as to output a notification that the first mode is current when an operation for causing the magnetic recording device to perform the read or write operation takes place.

DETAILED DESCRIPTION OF THE INVENTION

In the following, various preferred embodiments of the present invention will be explained with reference to the drawings.

Figure 1:
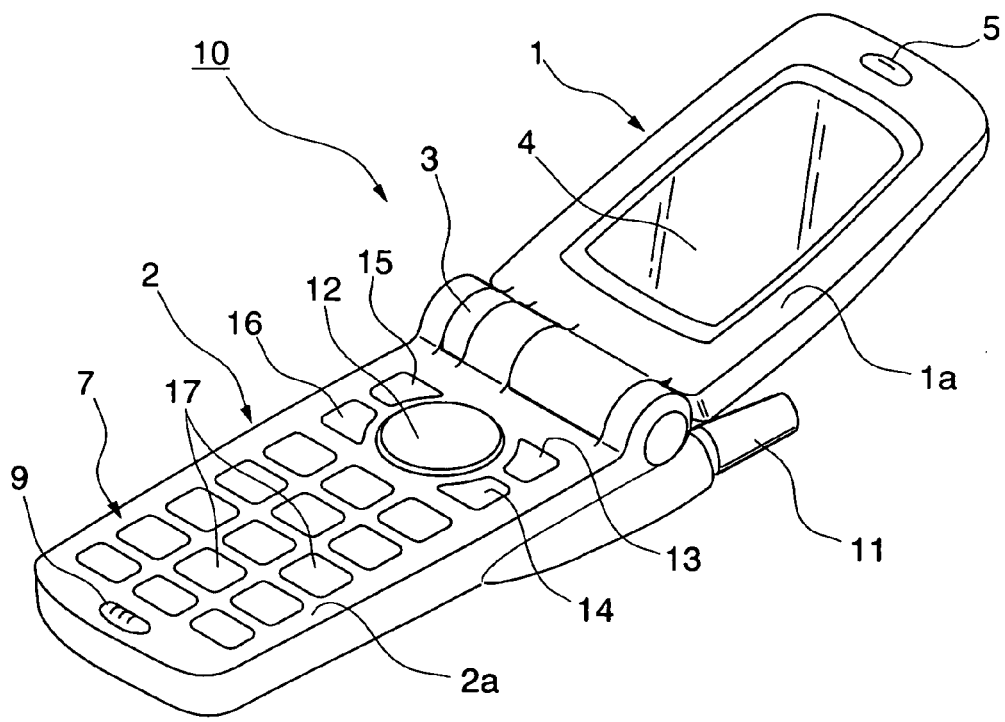
FIG. 1 is a perspective view showing a portable telephone unit according to the first embodiment of the present invention in its open state, as seen from its front side.
Figure 2:
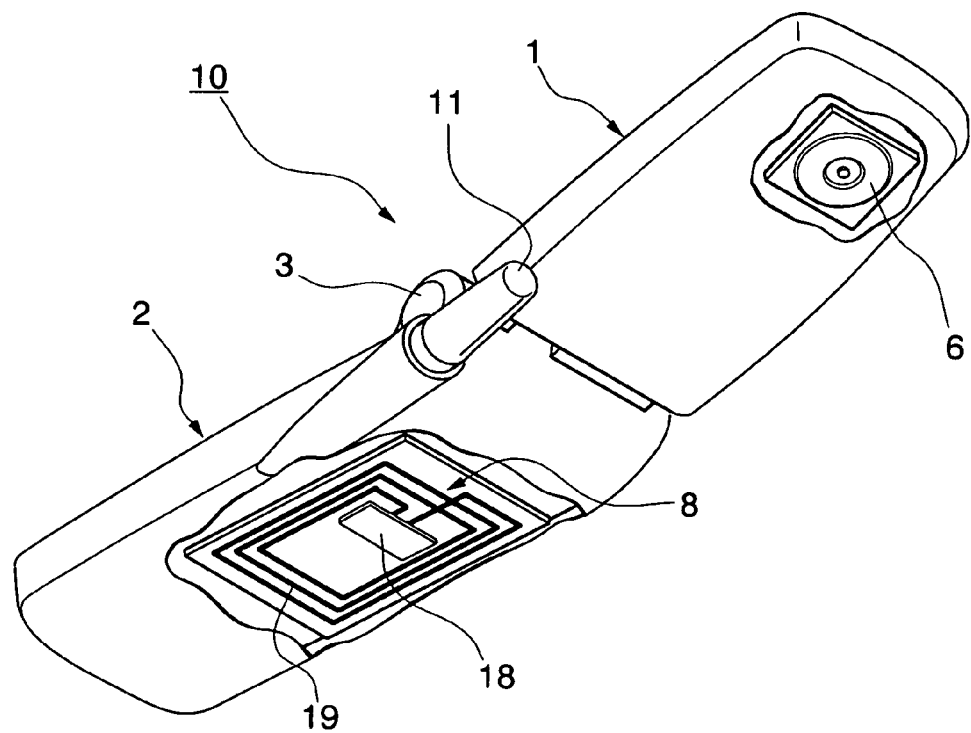
FIG. 2 is a perspective view of the same portable telephone unit according to the first embodiment of the present invention in its open state, as seen from its rear side, with portions of its outer casing removed to expose underlying structures.

As a first example of the portable electronic device according to a first embodiment of the present invention, there will be explained a portable telephone unit of a type which has two chassis which can be folded up so as to lie or pile against one another. FIG. 1 is a perspective view showing this portable telephone unit in its open state, as seen from its right front side at an angle. FIG. 2 is a perspective view of the same portable telephone unit in its open state, as seen from its right rear side at an angle, with portions of its outer casing removed to expose underlying structures.

Referring to these figures, this portable telephone unit 10 comprises a first chassis 1 and a second chassis 2. The two chassis 1 and 2 are connected together via a hinge portion 3, so that they can be freely either closed together or opened up away from one another. A display section 4 and a speaker section 5 are provided upon the face 1*a* of the first chassis 1 which confronts the second chassis 2, when these chassis 1 and 2 are closed together. A HDD section (a magnetic recording device) is provided in the interior of the first chassis 1. A key actuation section 7 and a microphone 9 are provided upon the face 2*a* of the second chassis 2 which confronts the first chassis 1, when these chassis 1 and 2 are closed together. A non contact type IC module 8 is provided in the interior of the second chassis 2, and moreover an antenna 11 is provided in the neighborhood of the hinge portion 3 of this second chassis 2, so as to be freely extensible for performing communication with a base station.

In the key actuation section 7, there are provided: a multi-function actuation key 12 which serves the functions of a four-way key, an acceptance key, and the like; an actuation key 13 related to actuation guidance; an actuation key 14 related to email; an actuation key 15 related to web browsing; an actuation key 16 related to a telephone book; actuation keys 17 which consist of digit keys "0" through "9" and a "*" key and a "#" key and the like, and of keys for initiating and terminating telephone connection; and the like. The non contact type IC module 8 comprises an IC chip 18 and an antenna coil 19 which is connected to this IC chip 18, and it is, for example, mounted upon the inner face of a battery cover (not shown in the figures) which constitutes a portion of the outer surface of the side of the second chassis 2 opposite to its confronting face 2*a*.

Figure 3:
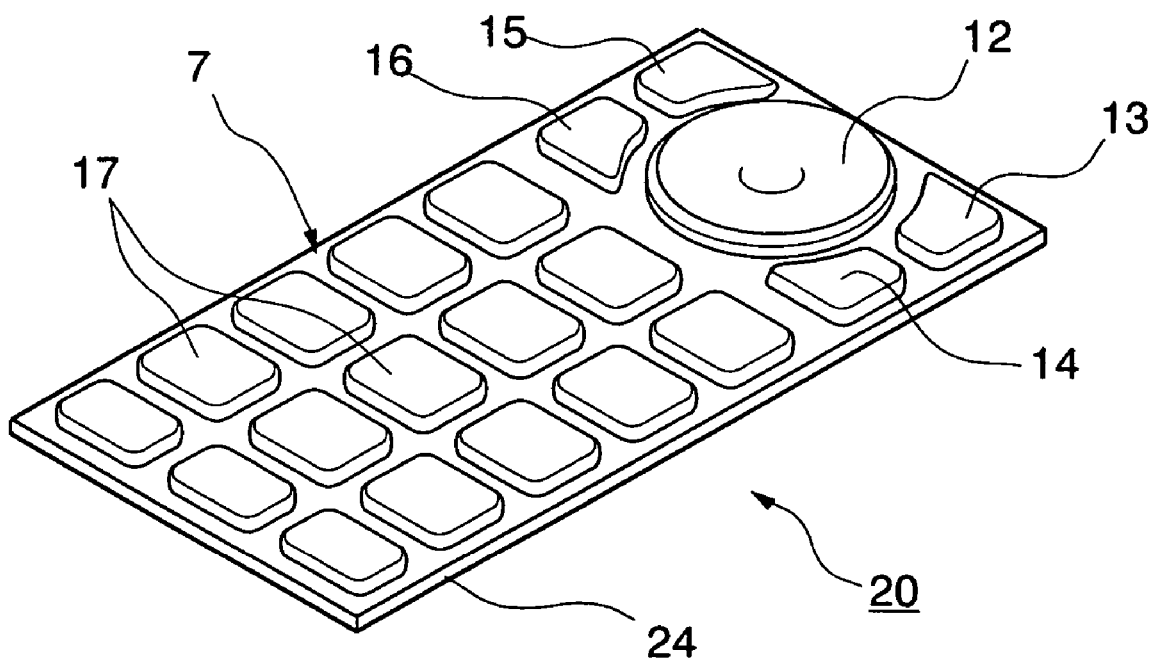
FIG. 3 is a perspective view showing a key sheet which is used in the portable telephone unit according to the first embodiment of the present invention.

FIG. 3 shows a key sheet 20 which is used in the key actuation section 7. The key sheet 20 comprises a rubber sheet 24 which is formed, as shown in the figure, in the form of a sheet, and the aforementioned various actuation keys 12 through 17 which are provided integrally upon this rubber sheet 24. The rubber sheet 24 is manufactured from an elastic material such as rubber or the like, in which there is incorporated an electromagnetic wave shielding substance such as, for example, ferrite or the like. Accordingly, this key sheet 20 functions as an electromagnetic wave shielding member.

Figure 4:
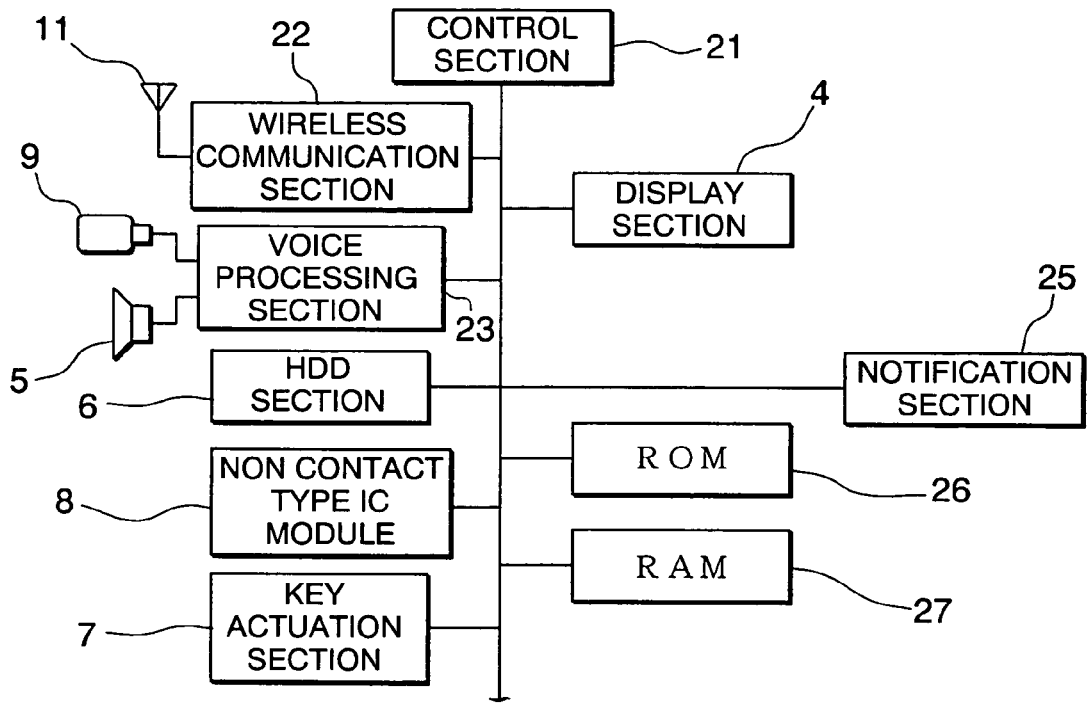
FIG. 4 is a block diagram showing the circuit structure of the portable telephone unit according to the first embodiment of the present invention.

FIG. 4 is a block diagram showing the structure of the portable telephone unit 10. In this figure, the same reference symbols are appended to parts which correspond to ones shown in FIGS. 1 and 2.

Referring to FIG. 4, the portable telephone unit 10 comprises a control section 21 such as a CPU or the like which performs overall control, and also a wireless communication section 22, a voice processing section 23, a notification section 25, a ROM 26 which stores a program and the like, a RAM 27 for use during processing, and the aforementioned HDD section 6, non contact type IC module 8, key actuation section 7, and display section 4, all of which are connected to the control section 21.

In order for the wireless communication section 22 to perform communication as a portable telephone unit, it is connected to the antenna 11. Along with processing a voice signal from the microphone 9 and sending it to the wireless communication section 22, the voice processing section 23 processes a voice signal which is received by the wireless communication section 22 and sends it to the speaker section 5. The notification section 25 is a portion of a notification means which notifies warning information and the like described hereinafter to the user, and performs this notification by ringing action or vibrating action. The HDD section 6 performs writing in and reading out of predetermined data such as image data, voice data, and the like upon a magnetic disk. The non contact type IC module 8 performs wireless communication with a data transmitting and receiving device which is provided to an automatic ticket examination machine or the like. The display section 4 also functions as notification.

Figure 5:
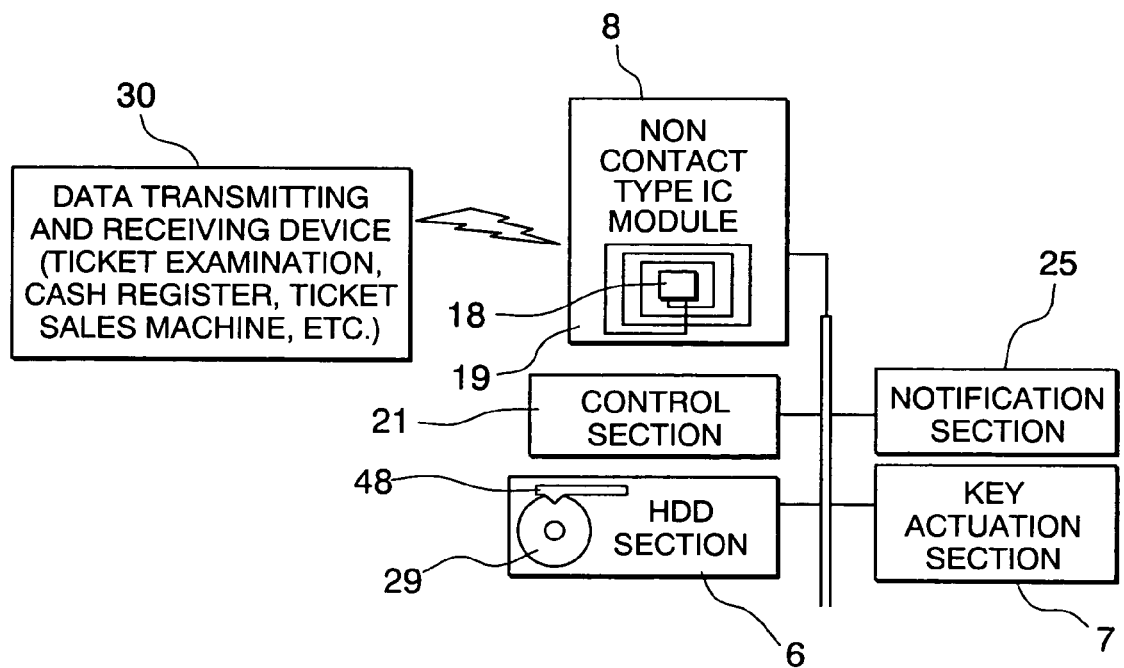
FIG. 5 is a block diagram showing the principal circuit structure of the portable telephone unit according to the first embodiment of the present invention.

FIG. 5 shows a main portion of the blocks illustrated in FIG. 4 which is related to the core concept of the present invention. In this figure, the same reference symbols are appended to elements which correspond to the elements shown in FIG. 4, and moreover explanation of such duplicated portions is omitted.

Referring to FIG. 5, the HDD section 6 comprises a magnetic head 48 for writing in or reading out, and a magnetic disk (a magnetic recording medium) 29. The HDD section 6 comprises a spindle motor which rotationally drives the magnetic disk 29, a voice coil motor which drives the magnetic head 48, a control circuit which performs various types of control including rotational control of these motors and the like, and transfer and receipt of data to and from the magnetic disk 29, and a buffer memory and so on; but the details thereof are not shown in the figures.

When it stops, the magnetic head 48 is positioned in a predetermined retraction or retraction position. When performing read or write operation, i.e., reading out or writing in of data, it is moved from the retraction position to a position over the recording surface of the magnetic disk 29 in which it can perform writing in or reading out of data thereto or therefrom, and it thereafter performs such data writing in or reading out. When the writing in or reading out of data has been completed, the magnetic head 48 is removed from above the magnetic disk 29 and is shifted back to its original retraction position. Furthermore, changes of mode are commanded by the user via the key actuation section 7 even during the read or write operation, the magnetic head 48 is still temporarily returned to its retraction position. The non contact type IC module 8 performs wireless communication with the data transmitting and receiving device 30. The data transmitting and receiving device 30 may be fitted to, for example, an automatic ticket examination machine, a ticket sales machine, a cash register, or the like.

Figure 6:
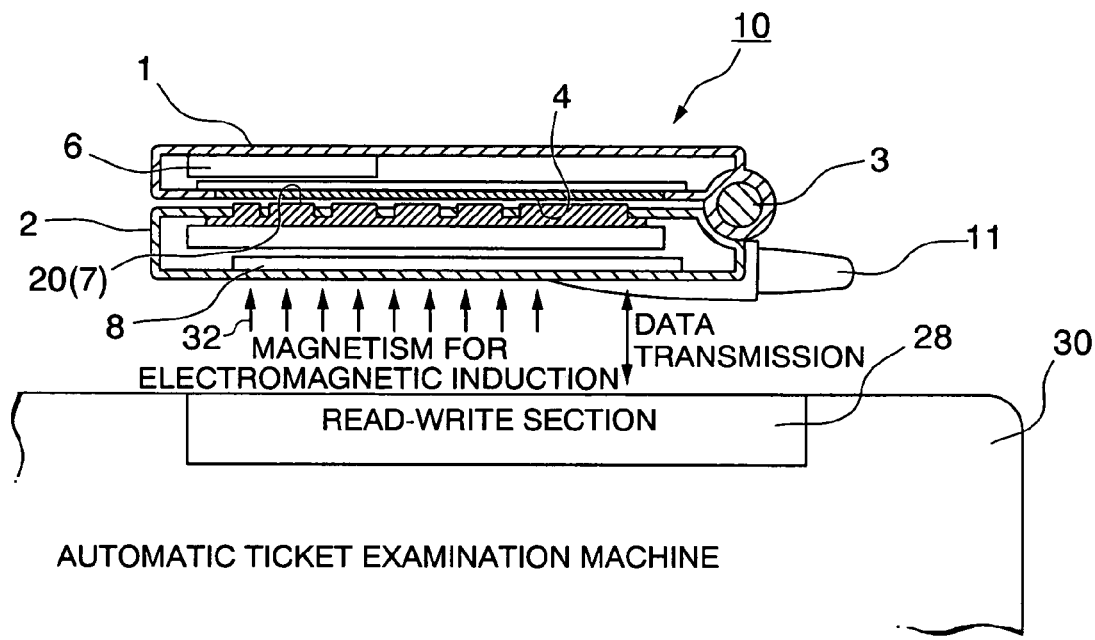
FIG. 6 is a sectional view, schematically showing the situation when the portable telephone unit according to the first embodiment of the present invention is being used at an automatic ticket examination machine.

FIG. 6 shows an example of the situation when this portable telephone unit is being used in its state in which the first chassis 1 and the second chassis 2 are folded together (i.e. its closed state). In this example, the elements of the portable telephone unit 10 are shown in their state in which they are receiving magnetism 32 in order, using the read-write section 28, to perform transmission and reception of data with the data transmission and reception section of the automatic ticket examination machine 30.

Referring to FIG. 6, in the closed state of the portable telephone unit 10, its first chassis 1 and its second chassis 2 are folded together as seen in the figure, so that the display section 4 and the key actuation section 7 are confronted to one another. In other words, the HDD section 6 and the non contact type IC module 8 are positioned so as to confront one another, while sandwiching the display section 4 and the key actuation section 7 between them.

The user who owns the portable telephone unit 10 passes the automatic ticket examination machine 30 while carrying the antenna coil 19 of the non contact type IC module 8 of the second chassis 2 over its read-write section 28. When he does this, an automatic ticket examination procedure is executed by transmission and reception of predetermined data between the non contact type IC module 8 and the read-write section 28.

A constant amount of magnetism 32 is emitted from the read-write section 28 to the antenna coil 19 of the non contact type IC module 8, in order to generate electrical power therein by electromagnetic induction.

At this time, the HDD section 6 and the non contact type IC module 8 are provided separately within the first chassis 1 and the second chassis 2 respectively, so that they are mutually separated from one another. Accordingly, even if the transmission and reception of data between the non contact type IC module 8 and the read-write section 28 are performed over only a short distance, it is possible to ensure that the influence upon the HDD section 6 due to the magnetism 32 or due to electromagnetic waves or the like is relatively small. Furthermore, if the portable telephone unit 10 is used in its open state (rather than in its closed state shown in FIG. 6), it is possible to ensure that in this opened state the HDD section 6 and the non contact type IC module 8 are even further separated apart from one another as compared to the closed state. Accordingly, it is possible to ensure that the influence upon the HDD section 6 due to the magnetism 32 or due to electromagnetic waves or the like is even smaller.

Furthermore, this magnetism 32 is intercepted by the key sheet 20, which functions as a magnetic shielding member which is disposed between the HDD section 6 and the non contact type IC module 8, so that the magnetism 32 is prevented from reaching the HDD section 6. Yet further, even though electromagnetic waves are generated due to communication between the read-write section 28 and the non contact type IC module 8, they are also shielded from the HDD section 6 by the key sheet 20.

It should be understood that, in this first embodiment of the present invention, the key sheet 20 in which the rubber sheet 24 includes a material which acts to shield electromagnetic waves is used, thus functioning as an electromagnetic wave shielding member. However, the present invention is not to be considered as being limited to this structure; for example, it would also be acceptable to use an electromagnetic wave shielding material for at least one, or both, of the confronting faces 1a and 2a of the first chassis 1 and the second chassis 2.

Furthermore, the non contact type IC module 8 may, for example, comprise an IC card, and this IC card may be capable of being removed from the portable telephone unit 10 and of being re-fitted thereto. Moreover, the HDD section 6 itself may also be capable of being removed from the portable telephone unit 10 and of being re-fitted thereto.

Yet further, the antenna coil 19 may also act as a charging device which charges up the battery of the portable telephone unit.

Even further, as the material for the electromagnetic wave shield, apart from ferrite, it would also be acceptable to utilize permalloy, silicon steel, amorphous alloy, or the like.

Still further although, in this first preferred embodiment of the present invention, the material for electromagnetic wave shielding was included within the rubber sheet 24 or the like, it would also be acceptable to utilize, as the electromagnetic wave shield member, a plate shaped body or a sheet shaped body which would constitute an electromagnetic wave shield material.

Moreover, the manner for opening apart and for closing together the first chassis 1 and the second chassis 2 is not to be considered as being limited to the above described folding together manner. In other words, a manner of opening the two chassis apart and of closing them together by relatively rotating them about an axial line extending in the thickness direction of these chassis as a center, or a manner of opening and closing them by sliding them mutually along one another, would also be acceptable. Whatever manner is employed, the closed state means that the two chassis are in the state of being laid or piled against one another and mutually superimposed, while the opened state means that the two chassis are in the state of being separated from one another, as shown by way of example in FIGS. 1 and 2.

Yet still furthermore although, in this first embodiment of the present invention, along with the HDD section 6 being provided within the first chassis 1, while the non contact type IC module 8 was provided within the second chassis 2, this is not to be considered as being limitative of the present invention. That is, it would also be possible for the non contact type IC module 8 to be provided within the first chassis 1, while the HDD section 6 was provided within the second chassis 2.

As has been explained above, in the portable telephone unit 10 according to the first embodiment of the present invention, the HDD 6 and the non contact type IC module 8 are provided as separated from each of the first chassis 1 and the second chassis 2. It is possible, therefore, to alleviate any negative influence exerted upon the HDD section 6 by the magnetism 32 and/or the electromagnetic waves which are caused to impinge from the read-write section 28 upon the antenna coil of the non contact type IC module 8 for performing communication.

Furthermore, even though communication may be performed between the non contact type IC module 8 and the read-write section 28 while the portable telephone unit 10 is in the closed state, nevertheless it is possible to avoid any bad influence being exerted by the above described magnetism 32 or electromagnetic waves upon the HDD section 6. This is because the key sheet 20 of sheet form which includes the electromagnetic wave shielding material is utilized in the key actuation section 7.

Yet further, since it is not particularly required to provide any separate electromagnetic wave shield member, the weight of the device is not increased by any such provision, and furthermore there is also no deterioration of the exterior design.

Returning again to FIG. 6, we consider the situation when the portable telephone unit 10 is used with an automatic ticket examination machine. The user who owns the portable telephone unit 10 goes past the automatic ticket examination machine while passing it, with the non contact type IC module 8 portion facing downwards, over the read-write section 28 of the data transmitting and receiving device 30. However, it may actually happen in practice that the user contacts the portable telephone unit forcibly against the read-write section 28, and it could happen that this shock might exert a negative influence upon the HDD section 6. This danger arises in the same manner when the portable telephone unit 10 is being used in its open state, as shown in FIGS. 1 and 2.

In order to cope with this problem, the portable telephone unit 10 of the first embodiment of the present invention can be set, according to actuation by the key actuation section 7, so as to be selectively changed over by the control section 21 between a first mode (mode #1) and a second mode (mode #2). The mode #1 is a mode in which, along with wireless communication by the non contact type IC module 8 being permitted, writing in and reading out (read/write operation) by the HDD section 6 are prevented. On the other hand, the mode #2 is a mode in which, along with wireless communication by the non contact type IC module 8 being prevented, writing in and also reading out by the HDD section 6 are permitted.

With the mode #1, the magnetic head 48 is kept in the retraction position, so that writing in and reading out by the HDD section 6 are prevented. Due to this, the occurrence of head crashing is positively prevented, even if a sudden shock is experienced, due to the portable telephone unit 10 coming into violent contact with the data transmitting and receiving device 30 or some other object. Furthermore, there is also no influence exerted due to the magnetism 32 from the data transmitting and receiving device 30.

With the mode #2, since communication by the non contact type IC module 8 is prevented, accordingly there is no possibility of any head crashing of the HDD section 6 being caused due to the above described shock action, or of any bad influence being exerted upon the HDD section 6 due to the magnetism 32 or due to electromagnetic waves. It is possible for the HDD section 6, accordingly, to perform the actions of writing in or reading out safely.

Next the operation when a command setting has been issued, by the user actuating the key actuation section 7, to change over the mode for the control section 21 (mode shifting) will be explained with reference to the flow charts shown in FIGS. 7 through 9.

Figure 7:
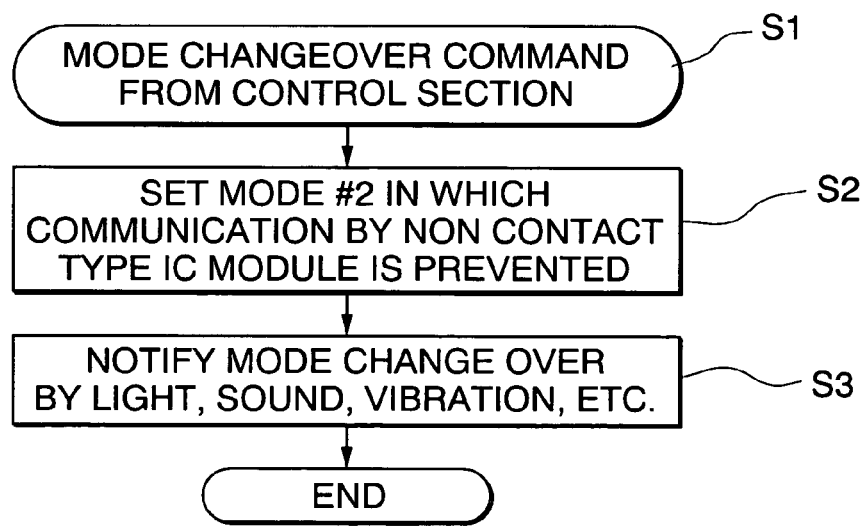
FIG. 7 is a flow chart showing the operation during a change over from a first mode to a second mode by the first embodiment and a second embodiment of the present invention.

Referring to the flow chart in FIG. 7, when a changeover from the mode #1 to the mode #2 is commanded (in the step S1) by the key actuation section 7 to the control section 21, wireless communication by the non contact type IC module 8 is prevented (in the step S2). Furthermore, the fact that the system has changed over to the mode #2 is notified to the user of the portable telephone unit 10 via the notification section 25 or the display section 4 (in the step S3).

Figure 8:
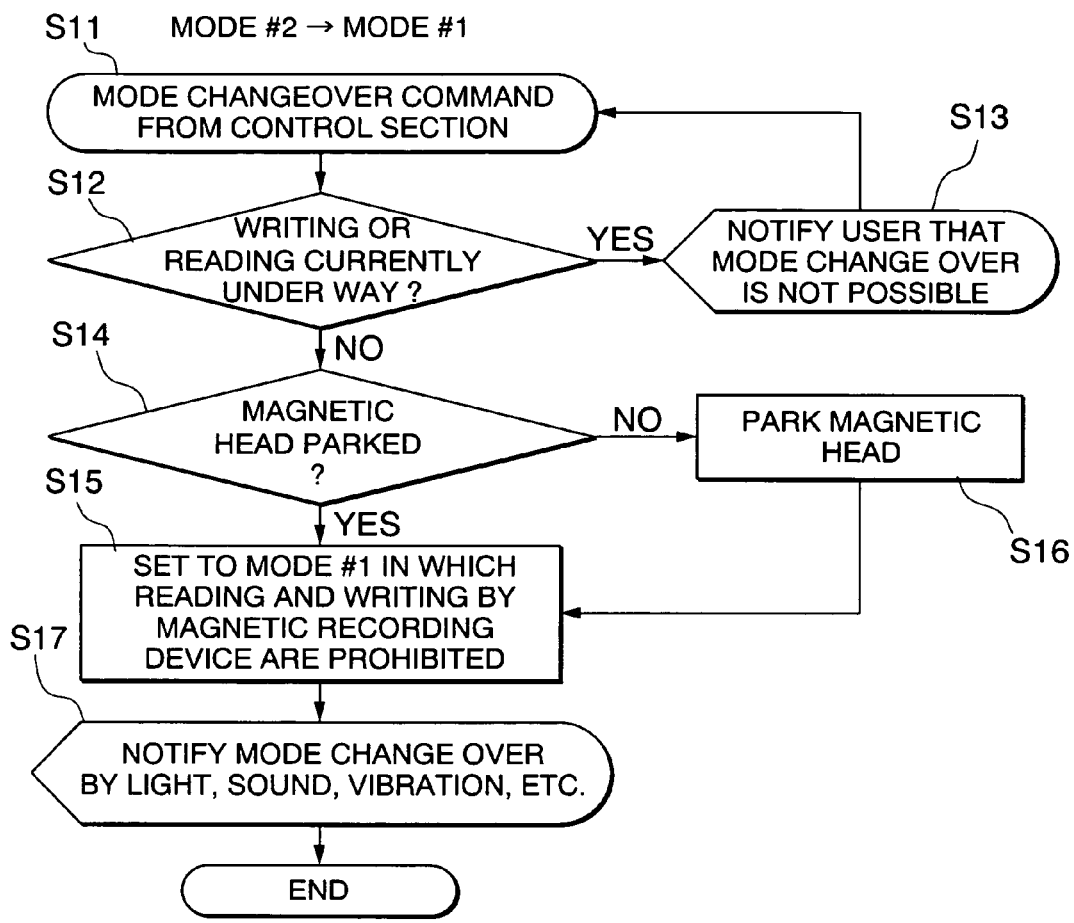
FIG. 8 is a flow chart showing the operations during the converse change over from the second mode to the first mode by the first and the second embodiments of the present invention.

Referring to the flow chart in FIG. 8, when a changeover from the mode #2 to the mode #1 is commanded (in the step S11), a decision is made (in the step S12) as to whether or not, at the current instant, the HDD section 6 is performing writing in or reading out operation. Here, if in fact the HDD section 6 is currently performing writing in or reading out action, a notification is outputted by the notification section 25 (in the step S13) to the effect that it is not possible to change over to the mode #1. On the other hand, if currently the HDD section 6 is not performing writing in or reading out action, then a decision is made (in the step S14) as to whether or not the magnetic head 48 is currently retracted or parked. If it is parked then writing in action and reading out action by the HDD section 6 are prevented (in the step S15). On the other hand, if the magnetic head 48 is not currently parked, then (in the step S16) the magnetic head 48 is made parked, and thereafter writing in action and reading out action by the HDD section 6 are prevented (in the step S15). After this, the fact that the parking action for the magnetic head has been completed, and the fact that the mode #1 has been switched over to, are notified to the user (in the step S17) via the notification section 25 or via the display section 4.

Figure 9:
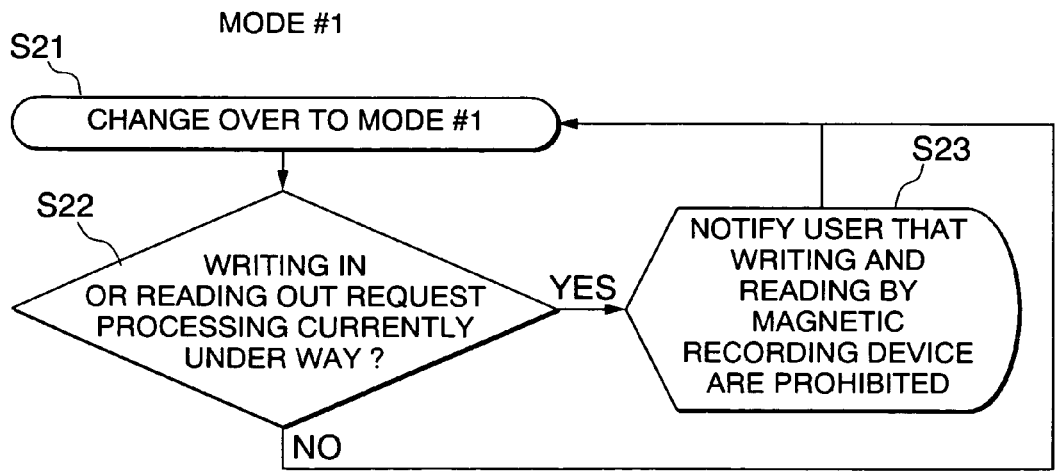
FIG. 9 is a flow chart showing the operation during the first mode by the first and the second embodiments of the present invention.

Referring to the flow chart in FIG. 9, when the system changes to the mode #1 (in the step S21) and, after that, a request for writing in to or reading out from the HDD section 6 occurs (i.e. when the result of the decision in the step S22 is YES), then the fact is notified to the user (in the step S23) that the system is in the mode #1, and that therefore writing in and reading out are not possible, via the notification section 25 or via the display section 4. Furthermore, if there is no request for writing in to or reading out from the HDD section 6 (i.e. when the result of the decision in the step S22 is NO), then the mode #1 is continued. The above described steps S21 through S23 are executed, as explained in FIG. 7, until the changeover from the mode #1 to the mode #2 is commanded.

According to the embodiment of the present invention, when the system is changed over from the mode #1 to the mode #2, wireless communication by the non contact type IC module 8 is prevented. Accordingly, it is possible for the HDD section 6 to perform writing in or reading out without experiencing any negative influence due to shock, or due to magnetism or electromagnetic waves.

When the system changes over from the mode #2 to the mode #1, writing in and reading out by the HDD section 6 are prohibited, with the magnetic head 48 being kept in its state in which it is shifted to its parked or retraction position. Furthermore, the fact that the parking action for the magnetic head 48 has been completed, and the fact that the changeover to the mode #1 has been performed, are notified to the user by the notification section 25. Accordingly, even if the portable telephone unit 10 is strongly struck against the read-write section 28, it is possible reliably to avoid head crashing due to this shock.

Moreover, along with the mode change over being notified to the user via the notification section 25 or the display section 4, even if the user should command writing in or reading out during the mode #1, the fact is notified to him that this action is impossible, so that thereby it is possible to attract the attention of the user.

Even when writing in or reading out by the HDD section 6 are being executed while the system is in the mode #2, along with shifting from the mode #2 to the mode #1 being prohibited, the fact that the system is in the mode #2 is notified to the user by the notification section 25 or the display section 4. Accordingly, the attention of the user is attracted to this fact, so that it is possible reliably to prevent head crashing due to the shock.

Since it is not possible for the non contact type IC module 8 to operate if the system is not changed over to the mode #1, it is possible to make the user aware that it is necessary for him to perform mode changing over when wireless communication is to be performed with the non contact type IC module 8 by using electromagnetic induction or magnetism. Furthermore, since it is not possible for the HDD section 6 to operate in the mode #1 even if the portable telephone unit 10 is struck relatively strongly against the data transmitting and receiving device 30 in this mode #1, it is possible to prevent the occurrence of head crashing due to such a shock since in this mode #1 the magnetic head 48 is in its parked or retraction position.

Figure 10:
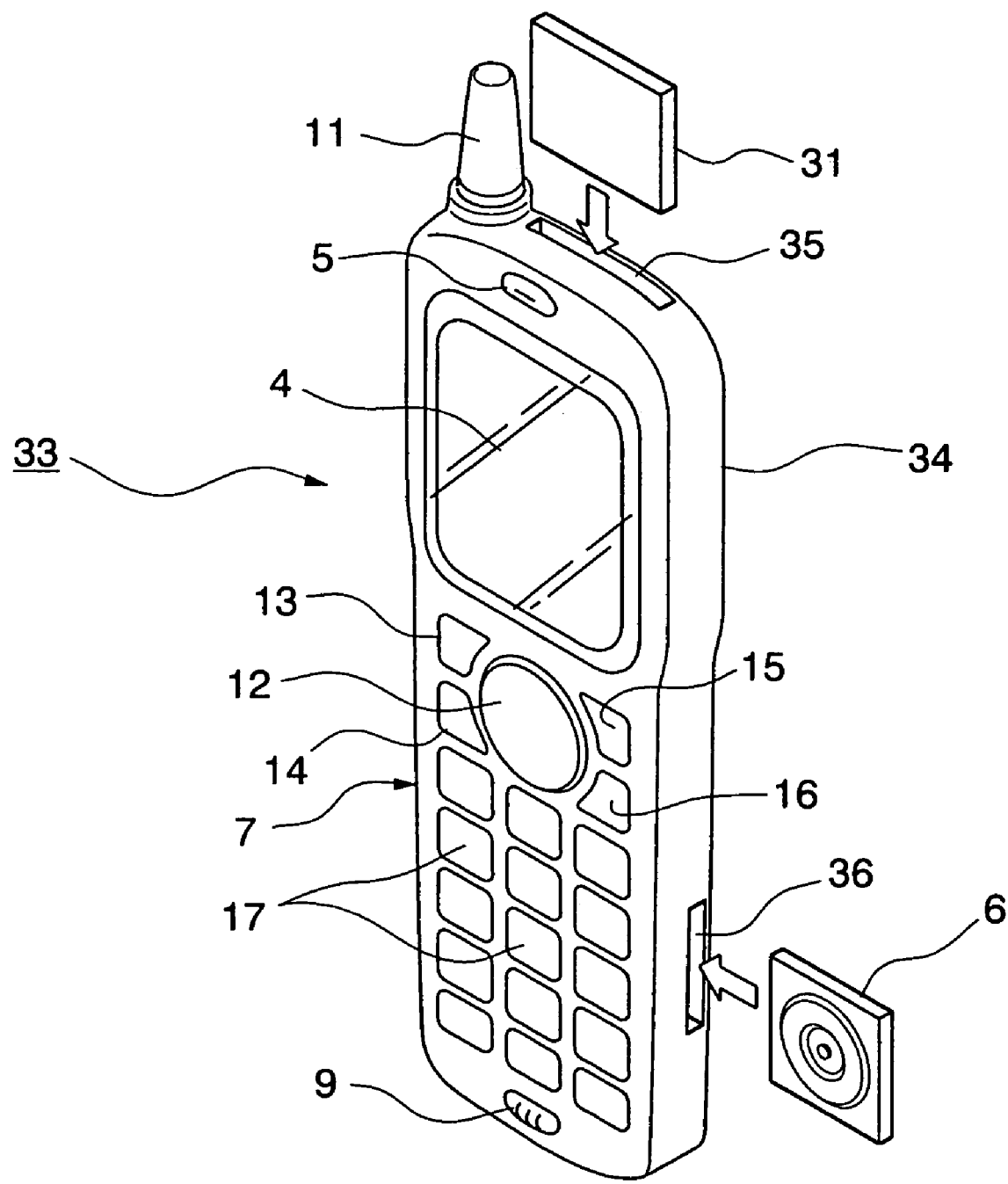
FIG. 10 is a perspective view showing a portable telephone unit according to the second embodiment of the present invention, as seen from its front side.

FIG. 10 shows a portable telephone unit 33 which is a portable electronic device according to a second embodiment of the present invention. The same reference symbols are appended to elements in FIG. 10 which correspond to the elements of the first embodiment shown in FIGS. 1 and 2, and explanation of such duplicated portions is omitted. Although, in the case of this second preferred embodiment, a portable telephone unit 33 which comprises only a single chassis 34 is shown, this is only by way of example and should not be considered as being limitative. That is, it would also be possible, for example, to utilize a structure which comprised two chassis, as in the case of the first embodiment described above.

Referring to FIG. 10, in this second preferred embodiment of the present invention, the non contact type IC module which was fitted to the first embodiment is mounted upon an IC card 31. This IC card 31 is fitted into a card insertion aperture 35 of the chassis 34 so as to be removable as desired. The HDD section 6 is also fitted into a HDD fitting aperture 36 so as to be removable as desired.

Figure 11:
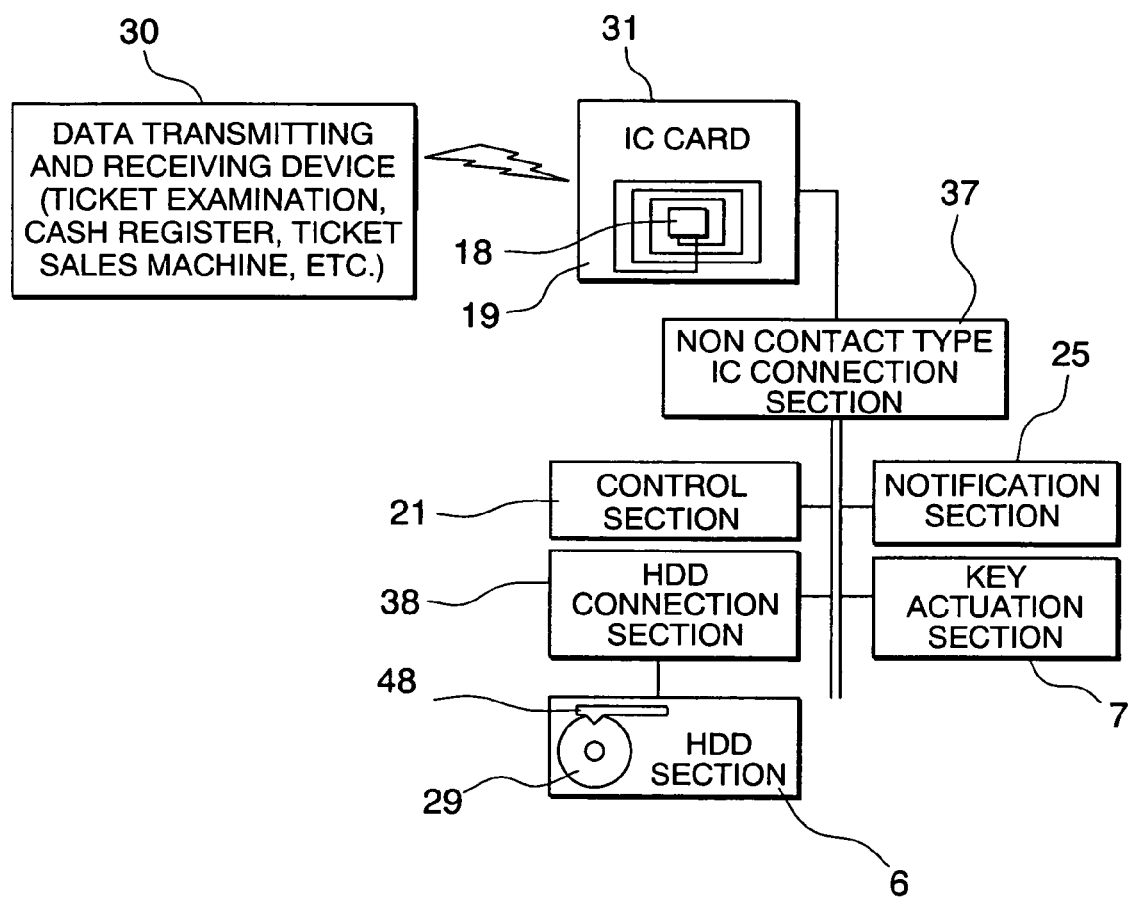
FIG. 11 is a block diagram showing the principal circuit structure of the portable telephone unit according to the second embodiment of the present invention.

FIG. 11 is a block diagram showing the principal structural portion of the second embodiment of the present invention. The same reference symbols are appended to elements in this figure which correspond to the elements of the first embodiment shown in FIG. 5, and moreover explanation of such duplicated portions is omitted.

Referring to FIG. 11, when the IC card 31 is fitted into the card insertion aperture 35, a connection system (not shown in the figures) of this card 31 is connected to a non contact IC connection section 37 which is provided within the card insertion aperture 35. Similarly, when the HDD section 6 is inserted into the HDD fitting aperture 36, a connection system (not shown in the figures) of this HDD section 6 is connected to a HDD connection section 38 which is provided within the HDD fitting aperture 36.

The portable telephone unit 33 according to the second embodiment can also be changed over between a mode #1 and a mode #2, in the same way as the portable telephone unit 10 of the first embodiment described above, and it operates according to the mode of control which was explained above with reference to the flow charts of FIGS. 7 through 9.

According to the second embodiment which uses the detachable IC card 31 and the detachable HDD section 6, it is possible to make the portable telephone unit 33 more compact and lighter. Furthermore, since a plurality of such detachable IC cards 31 and detachable HDD sections 6 may be used with a single portable telephone unit 33, it is possible to obtain the same beneficial effects as with the first embodiment of the present invention, while enhancing the convenience for the user. It should be understood that it would also be acceptable to make, only, one or the other of the IC card 31 and the HDD section 6 detachable, while making the other one of them fixed within the interior of the portable telephone unit 33.

It should be understood that, in the above described first and second embodiments of the present invention, the application to a portable electronic device which is a portable telephone unit has been explained. However, the present invention is not to be considered as being limited to this particular application; it could also be applied to any type of portable electronic device which, at least, is capable of wireless communication and which comprises a magnetic storage device, such as a portable information terminal (PDA) or a music replay device, or the like.

As per the above explanation, according to the present invention, it is possible to protect the HDD which is provided within the portable electronic device, when that portable electronic device is performing data transmission and reception with a reader-writer, which is a data transmitting and receiving device.

Furthermore, according to one aspect of the present invention, the wireless communication module such as a non contact type IC module or the like and the magnetic recording device such as an HDD or the like are provided within separate chassis and are arranged as being separated from one another. Accordingly, it is possible to alleviate any negative influence upon the magnetic recording device due to magnetism or electromagnetic waves which are supplied to the wireless communication module.

Yet further, according to the present invention, it is not possible for communication by the wireless communication module such as a non contact type IC module or the like to be performed unless the system is switched over to the first mode. Accordingly, when communication is to be performed using the non contact type IC module, it is possible to make the user aware of the necessity of changing over the operational mode of the system. Furthermore, it is arranged to prevent the operation of the magnetic recording device such as an HDD or the like during the first mode #1. It is, therefore, possible to prevent the occurrence of head crashing or the like due to the shock even if the portable electronic device is strongly contacted against a data transmitting and receiving device or the like.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A portable electronic device comprising:
   a non contact type IC module;
   a magnetic recording device operable to perform read or write operation while positioning a magnetic head over a magnetic recording medium from a predetermined retraction position; and
   a control section operable to set said portable electronic device to a first mode and a second mode, in which a wireless communication operation by said non contact type IC module is permitted but said read or write operation by said magnetic recording device is prohibited in said first mode, and in which said read or write operation by said magnetic recording device is permitted but said wireless communication operation by said non contact type IC module is prohibited in said second mode.

2. The portable electronic device according to claim 1, wherein said control section prohibits shifting from said second mode to said first mode even if an operation for shifting from said second mode to said first mode is made while said magnetic recording device performs said read or write operation in said second mode.

3. The portable electronic device according to claim 2, further comprising a notification section wherein said control section controls said notification section so as to output a notification that shifting to said first mode has been prohibited when said operation for shifting to said first mode has been prohibited.

4. The portable electronic device according to claim 1, wherein:
   said control section prohibits shifting from said second mode to said first mode even if an operation for shifting from said second mode to said first mode is made while said magnetic recording device performs said read or write operation in said second mode; and
   said control section permits shifting from said second mode to said first mode when an operation for shifting from said second mode to said first mode is made while said magnetic recording device stops performing said read or write operation in said second mode.

5. The portable electronic device according to claim 4, further comprising a notification section, wherein said control section controls said notification section so as to output a notification that:
   shifting to said first mode has been prohibited when said operation for shifting to said first mode has been prohibited; and
   shifting to said first mode has been completed when said operation for shifting to said first mode has been permitted.

6. The portable electronic device according to claim 1, further comprising a notification section, wherein said control section controls:

said notification section so as to output a notification that said magnetic recording device performs said read or write operation when an operation for shifting from said second mode to said first mode is made while said magnetic recording device performs said read or write operation in said second mode;

said magnetic recording device to move said magnetic head to said retraction position;

said portable electronic device to be said first mode after said magnetic head is retracted to said retraction position; and said notification section so as to output a notification that shifting to said first mode has been completed.

7. The portable electronic device according to claim 6, wherein said control section controls said notification section so as to output a notification that said portable electronic device is in said first mode when an operation for causing said magnetic recording device to perform said read or write operation takes place.

* * * * *